(12) United States Patent
Huang et al.

(10) Patent No.: US 8,305,718 B2
(45) Date of Patent: *Nov. 6, 2012

(54) LOW PARASITIC CAPACITANCE ELECTROSTATIC DISCHARGE PROTECTION CIRCUIT

(75) Inventors: Bo-Jr Huang, Taipei (TW); Huei Wang, Taipei (TW)

(73) Assignee: National Taiwan University, Taipei (TW)

( * ) Notice: Subject to any disclaimer, the term of this patent is extended or adjusted under 35 U.S.C. 154(b) by 256 days.

This patent is subject to a terminal disclaimer.

(21) Appl. No.: 12/795,386

(22) Filed: Jun. 7, 2010

(65) Prior Publication Data

US 2011/0211285 A1    Sep. 1, 2011

(30) Foreign Application Priority Data

Feb. 26, 2010    (TW) .............................. 99105592 A

(51) Int. Cl.
*H02H 9/00* (2006.01)
*H02H 1/00* (2006.01)
*H02H 1/04* (2006.01)
*H02H 3/22* (2006.01)
*H02H 9/06* (2006.01)

(52) U.S. Cl. ......................................... 361/56; 361/118
(58) Field of Classification Search ...................... 361/56
See application file for complete search history.

(56) References Cited

U.S. PATENT DOCUMENTS

| | | | |
|---|---|---|---|
| 6,693,780 B2 * | 2/2004 | Spehar et al. ................... | 361/56 |
| 6,801,416 B2 * | 10/2004 | Hatzilambrou et al. ......... | 361/56 |
| 6,885,534 B2 | 4/2005 | Ker et al. | |
| 6,894,567 B2 | 5/2005 | Vickram et al. | |
| 7,009,826 B2 | 3/2006 | Ker et al. | |
| 7,023,678 B2 | 4/2006 | Ker et al. | |
| 7,280,332 B2 * | 10/2007 | Ma et al. ....................... | 361/91.1 |
| 7,391,596 B2 | 6/2008 | Khorram | |
| 7,649,722 B2 * | 1/2010 | Thijs et al. ....................... | 361/56 |
| 7,848,069 B2 * | 12/2010 | Ootsuka et al. .................. | 361/56 |
| 7,974,053 B2 * | 7/2011 | Ker et al. ......................... | 361/56 |

OTHER PUBLICATIONS

Ming-Dou Ker, Design on ESD Protection Scheme for IC With Power-Down-Mode Operation, IEEE Journal of Solid-State Circuits, vol. 39, No. 8, Aug. 2004, pp. 1378-1382.
Ming-Dou Ker, Design on Power-Rail ESD Clamp Circuit for 3.3-V I/O Interface by Using Only 1-V/2.5-V Low-Voltage Devices in a 130-nm CMOS Process, IEEE Transactions on Circuits and Systems—1:Regular Papers, vol. 53, No. 10, Oct. 2006, pp. 2187-2193.
Sherif Galal, Broadband ESD Protection Circuits in CMOS Technology, IEEE Journal of Solid-State Circuits, vol. 38, No. 12, Dec. 2003, pp. 2334-2340.
Ming-Dou Ker, Decreasing-Size Distributed ESD Protection Scheme for Broad-Band RF Circuits, IEEE Transactions on Microwave Theory and Techniques, vol. 53, No. 2, Feb. 2005, pp. 582-589.

* cited by examiner

*Primary Examiner* — Dharti Patel
(74) *Attorney, Agent, or Firm* — Muncy, Geissler, Olds & Lowe, PLLC

(57) ABSTRACT

The present invention relates to an electrostatic discharge (ESD) protection circuit, and more particularly to a low parasitic capacitance electrostatic discharge protection circuit. An ESD protection circuit is established with the structure in accordance with the present invention comprising a plurality of discharging paths. The ESD protection circuit is connected to the input/output pad of a radio frequency (RF) core circuit. Such that, the RF core circuit with the ESD protection circuit of the present invention feature much higher ESD robustness. And the parasitic capacitance of the ESD protection is reduced because of the structure of the present invention.

14 Claims, 10 Drawing Sheets

LOW PARASITIC CAPACITANCE ELECTROSTATIC DISCHARGE PROTECTION CIRCUIT

FIELD OF THE INVENTION

The present invention relates to an electrostatic discharge (ESD) protection circuit, and more particularly to a low parasitic capacitance electrostatic discharge protection circuit.

BACKGROUND OF THE INVENTION

Nowadays, the wireless communication industry plays a much important role in the economic advancement. A variety of Radio Frequency (RF) circuit designs and researches are provided for improving the efficiency or performance of the RF devices.

With respect to the radio frequency transceiver circuit or sub-circuit, such as a low noise amplifier or a power amplifier, the input/output (I/O) pad is exposed directly to the environment through an antenna or other I/O element. Thus, it is possible for the RF transceiver circuit or sub-circuit to be damaged by the electrostatic discharge (ESD) that occurs in the environment because of the weather or other artificial interference.

A traditional ESD protection circuit is shown in FIG. 1. The ESD protection circuit 16 is attached to the I/O pad 14 of the RF circuit 12. The ESD protection circuit 16 comprises a diode 161 connected between the I/O pad 14 and the power source VC, and a diode 163 connected between the I/O pad 14 and the ground. Wherein the diode 161 is used as a positive ESD path, and the diode 163 is used as a negative ESD path.

When a positive ESD occurs at the I/O pad 14, the diode 161 will be under forward-biased condition, and the ESD current will be conducted to the power source VC through the positive ESD path. When a negative ESD occurs at the I/O pad 14, the diode 163 will be under forward-biased condition, and the ESD current will be conducted to the ground through the negative ESD path.

For an ESD protection circuit, the more ESD paths are comprised, the less discharging time is needed, and the more robust the ESD protection circuit is. On the other hand, if there are more diodes used as ESD paths in the ESD protection circuit, the larger the parasitic capacitance is, and the performance of the RF circuit will be degraded much seriously.

Referring to FIG. 2, there is shown a schematic diagram of another conventional ESD protection circuit. The ESD protection circuit 20 is attached to the I/O pad 203 of the RF circuit 201. The ESD protection circuit 20 comprises a plurality of diodes 221, 223, 225, 241, 243, and 245. The diodes 221, 223, and 225 are connected between the power source 205 and the I/O pad 203 in series forming a positive ESD path. The diodes 241, 243, and 245 are connected between the I/O pad 203 and the ground 207 in series forming a negative ESD path.

The ESD path with a plurality of diodes connected in series can abide much higher voltage ESD stress. And the series connecting structure reduces the total parasitic capacitance of diodes.

However, each ESD path of the ESD protection circuit 20 comprises three diodes. In other words, the turn-on voltage of the ESD path is higher than three times of the threshold voltage of the diode. If the ESD voltage is lower than three times of the threshold voltage of the diode, the ESD path will not be turned-on, and the RF circuit 201 may be damaged by the ESD current.

Furthermore, as the number of diodes connected in series increases, the parasitic capacitance 32 reduces, and the equivalent impedance 34 of the ESD path increases linearly, as shown in FIG. 3. If the equivalent impedance of the ESD path increases, the ESD current conducting will be less efficient.

SUMMARY OF THE INVENTION

It is an objective of the present invention to provide an electrostatic discharge (ESD) protection circuit, and more particularly to a low parasitic capacitance ESD protection circuit.

It is another objective of the present invention to provide a low parasitic capacitance ESD protection circuit comprising a plurality of diodes, wherein the plurality of diodes construct a plurality of positive ESD paths and a plurality of negative ESD paths. The diodes are configured to improve the ESD robustness of the RF core circuit.

It is another objective of the present invention to provide a low parasitic capacitance ESD protection circuit comprising a plurality of diodes, wherein the plurality of diodes construct a plurality of positive ESD paths and a plurality of negative ESD paths. The diodes are configured to reduce the parasitic capacitance.

It is another objective of the present invention to provide a low parasitic capacitance ESD protection circuit for applications in gallium arsenic (GaAs) based process.

It is another objective of the present invention to provide a low parasitic capacitance ESD protection circuit for intergraded with an RF core circuit in a chip.

It is another objective of the present invention to provide a low parasitic capacitance ESD protection circuit for integrated with an RF core circuit, such as an RF transceiver, a low noise amplifier, a power amplifier or a mixer.

The present invention provides a low parasitic capacitance ESD protection circuit which is connected to an input/output (I/O) pad of a radio frequency (RF) core circuit, comprising: a first diode and a second diode, wherein the first diode is connected between a power source and the I/O pad, the second diode is connected between the I/O pad and the ground, and the first diode and the second diode are connected in series; a third diode and a fourth diode connected between the power source and the ground in series; and a fifth diode and a sixth diode connected between the I/O pad and the connection node of the third diode and the fourth diode reversely in parallel.

The present invention further provides a low parasitic capacitance ESD protection circuit which is connected to an I/O pad of an RF core circuit, comprising: a plurality of first diodes connected between a power source and the ground in series; a plurality of second diodes connected between the power source and the ground in series; and a pair of third diode and fourth diode connected between one connection node of the second diodes and the I/O pad reversely in parallel.

DETAILED DESCRIPTION OF DISCLOSED EMBODIMENTS

Figure 4:
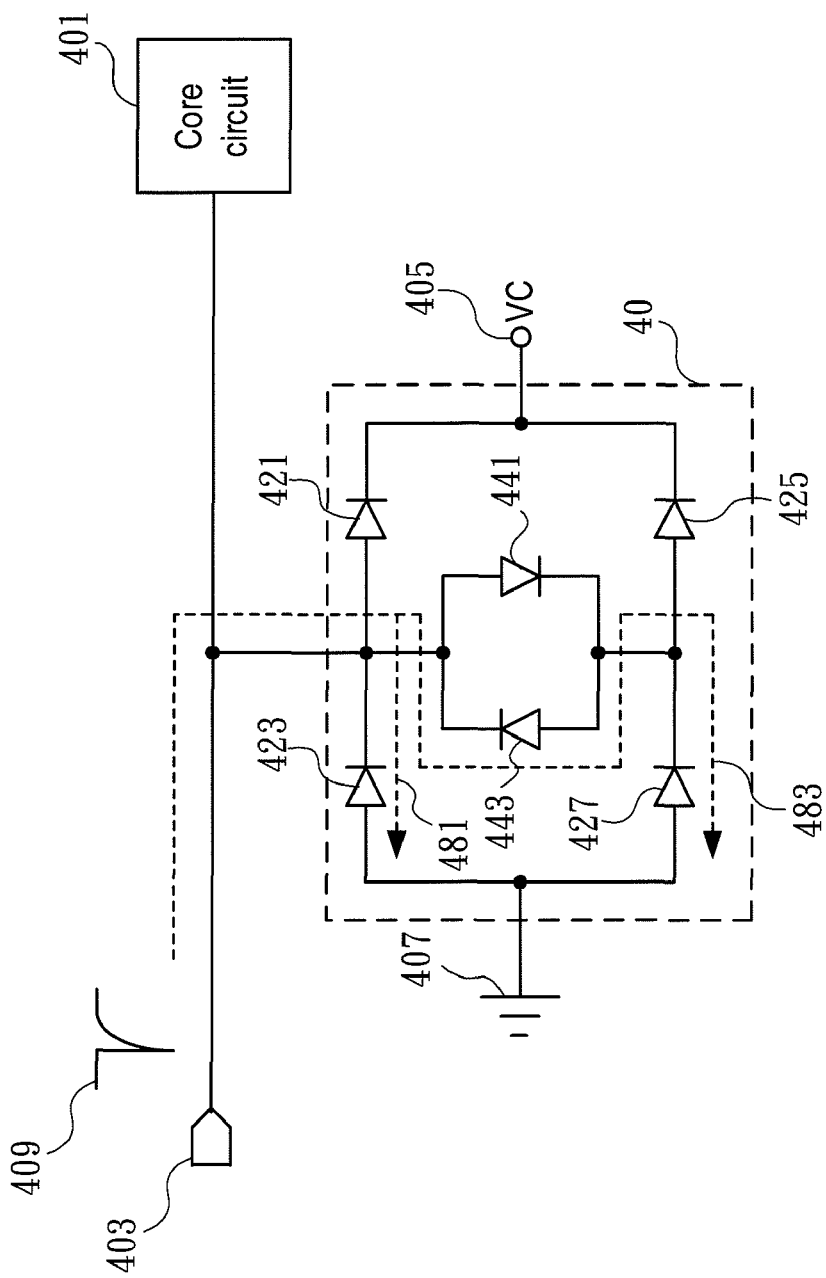
FIG. 4 is a schematic diagram of an ESD protection circuit in accordance with one embodiment of the present invention.

Referring to FIG. 4, there is shown a schematic diagram of an ESD protection circuit in accordance with one embodiment of the present invention. The low parasitic capacitance ESD protection circuit 40 comprises a first diode 421, a second diode 423, a third diode 425, a fourth diode 427, a fifth diode 441, and a sixth diode 443.

The first diode 421 is connected between a power source 405 and an input/output (I/O) pad 403, the second diode 423 is connected between the I/O pad 403 and the ground 407, and the first diode 421 and the second diode 423 are connected in series. The third diode 425 and the fourth diode 427 are connected between the power source 405 and the ground 407 in series. The fifth diode 441 and the sixth diode 443 are connected between the I/O pad 403 and the connection node of the third diode 425 and the fourth diode 427 reversely in parallel.

In the present invention, when a negative ESD 409 occurs at the I/O pad 403, the second diode 423, the sixth diode 443, and the fourth diode 427 will be under forward-biased condition, and the ESD current will be conducted to the ground 407 through the ESD paths 481 and 483.

Figure 5:
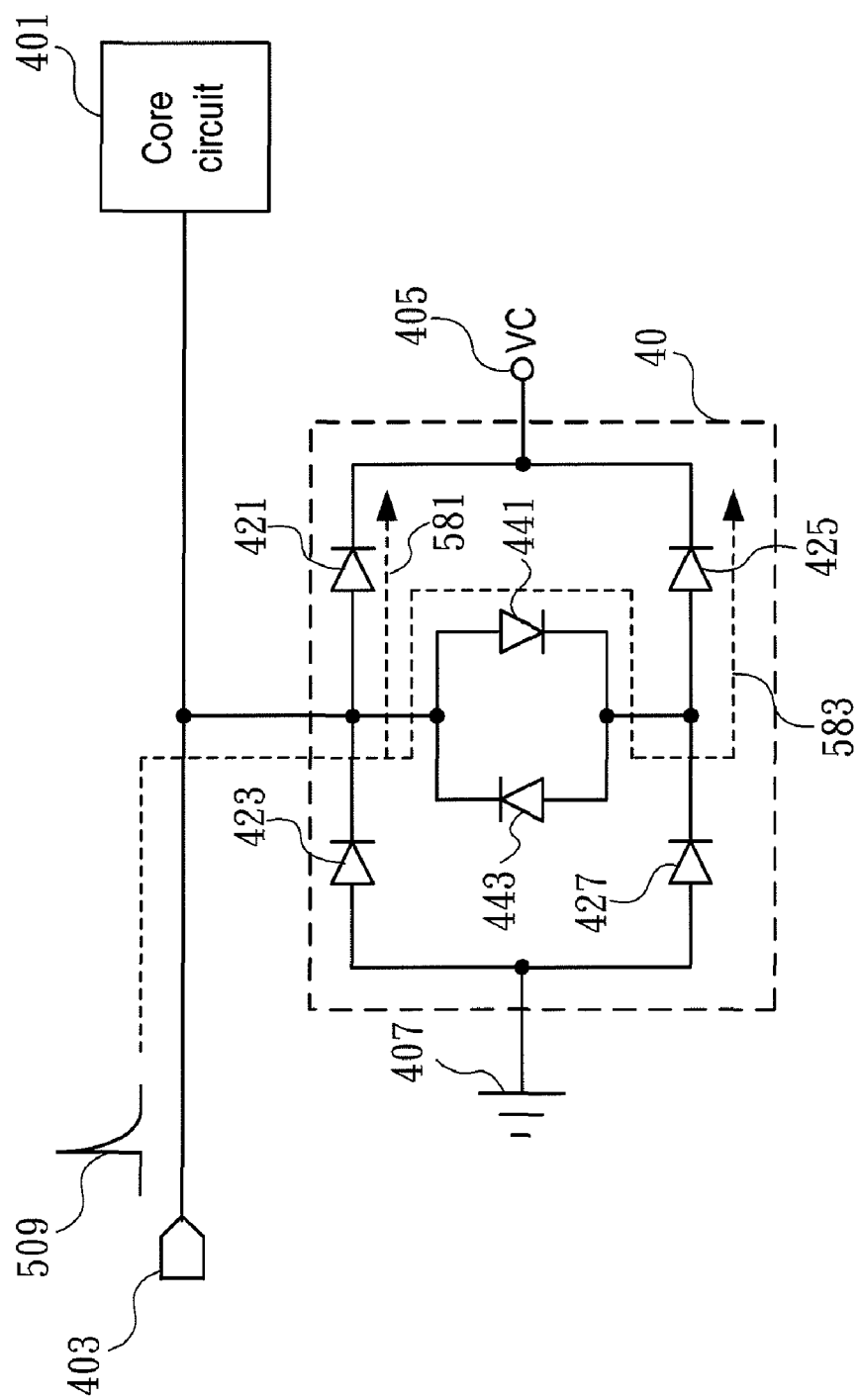
FIG. 5 is a schematic diagram of positive ESD paths in accordance with the embodiment shown in FIG. 4.

Referring to FIG. 5, there is shown a schematic diagram of positive ESD paths in accordance with the embodiment shown in FIG. 4. When a positive ESD 509 occurs at the I/O pad 403, the first diode 421, the fifth diode 441, and the third diode 425 will be under forward-biased condition, and the ESD current will be conducted to the power source 405 through the ESD paths 581 and 583.

In one embodiment of the present invention, some configuration of diodes is preferable. The first diode 421 and the second diode 423 have the same size of area. The third diode 425 and the fourth diode 427 have the same size of area. The fifth diode 441 and the sixth diode 443 have the same size of area. The ratio of the area of the first diode 421, third diode 425, and fifth diode 441 is preferably 1:9:4. For example, the area of the first diode 421 and second diode 423 are selected to be 10 μm×10 μm, the area of the third diode 425 and fourth diode 427 are 30 μm×30 μm, and the area of the fifth diode 441 and sixth diode 443 are 20 μm×20 μm.

With the abovementioned configuration, the diodes in the ESD path near the I/O pad 403 have area size smaller than the diodes in the ESD path far away from the I/O pad 403. This is good for the ESD current to spread into different ESD paths.

Figure 6:
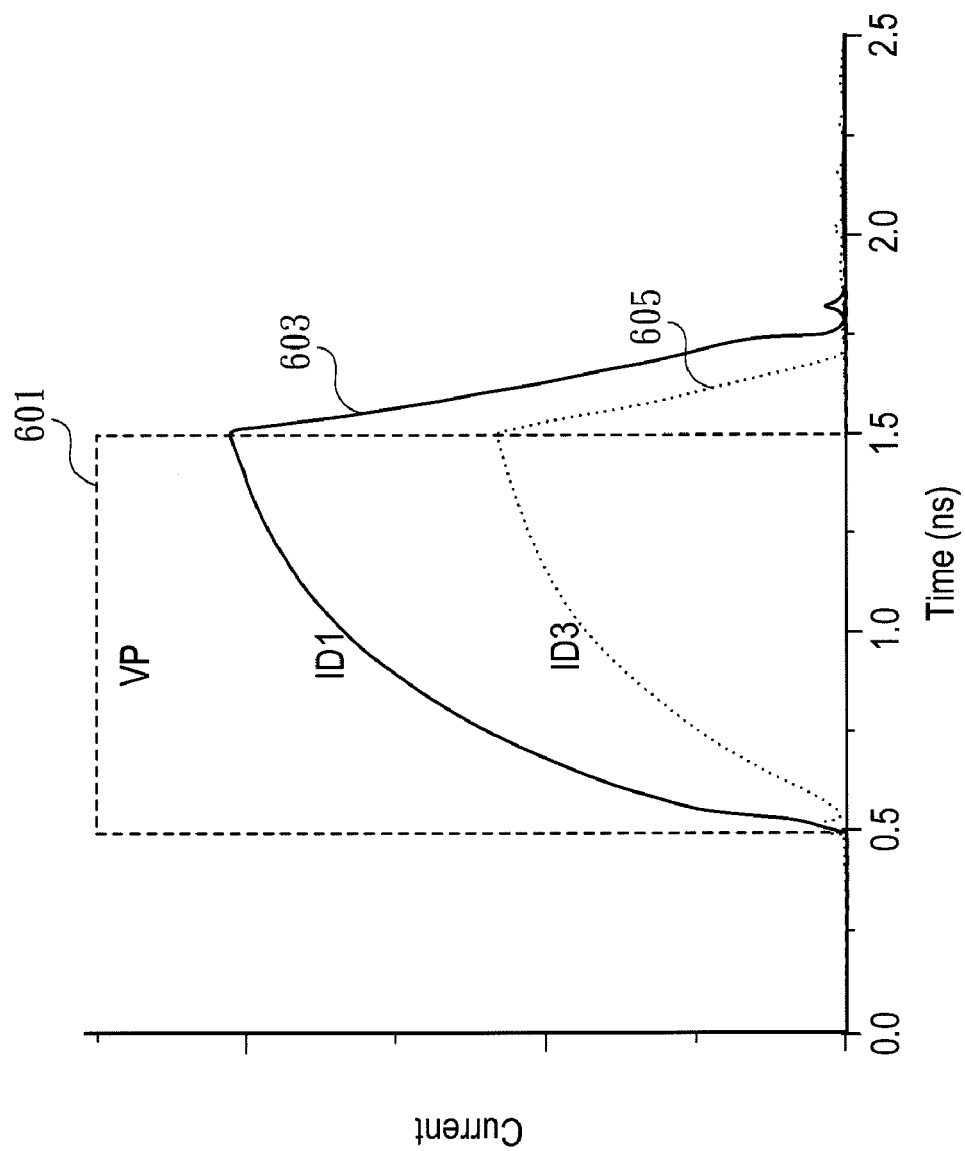
FIG. 6 is a current timing diagram of the ESD protection circuit in accordance with the embodiment shown in FIG. 4 during a positive ESD process.

Referring to FIG. 6, there is shown a current timing diagram of the ESD protection circuit in accordance with the embodiment shown in FIG. 4 during a positive ESD process.

In this case, a high voltage pulse 601 with 1-ns duration is applied to the low parasitic capacitance ESD protection circuit 40. The first diode D1 is under the forward-bias condition during the ESD process. The current 603 passing through the first diode D1 rises following the ESD pulse, and falls to 0 about 0.3 ns after the end of the ESD pulse.

The third diode D3 is under the forward-bias condition during the ESD process. The current 605 passing through the third diode D3 also rises following the ESD pulse, and falls to 0 about 0.2 ns after the end of the ESD pulse. Wherein, about 64% of the ESD current is conducted to the power source through the first diode D1, and about 36% of the ESD current is conducted to the power source through the third diode D3.

Figure 7:
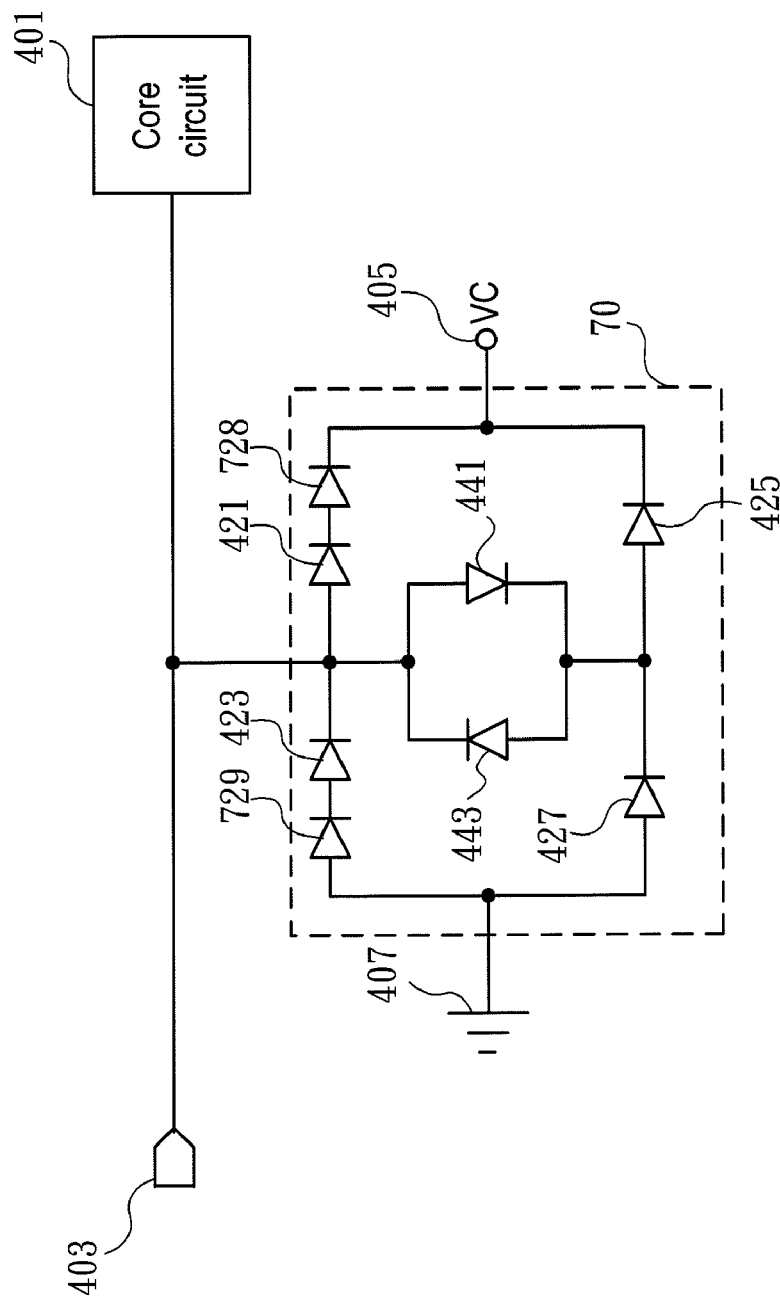
FIG. 7 is a schematic diagram of an ESD protection circuit in accordance with another embodiment of the present invention.

Referring to FIG. 7, there is shown an ESD protection circuit in accordance with another embodiment of the present invention. The area size of the first diode 421 and second diode 423 of the embodiment shown in FIG. 4 are smaller than other diodes. Such that, the first diode 421 and the second diode 423 can abide lower voltage ESD stress relatively. According to FIG. 6, most of the ESD current is conducted to the power source or ground through the first diode 421 and second diode 423. In this case, the robustness of the ESD protection circuit 40 will be restricted. The low parasitic capacitance ESD protection circuit 70 of the present embodiment is a modification of the embodiment shown in FIG. 4.

The configuration of the low parasitic capacitance ESD protection circuit 70 is almost the same as the embodiment shown in FIG. 4. The ESD protection circuit 70 further comprises a seventh diode 728 and an eighth diode 729. The seventh diode 728 is connected between the first diode 421 and the power source 405. The eighth diode 729 is connected between the second diode 423 and the ground 407. The size of area of the seventh diode 728 and the eighth diode 729 are the same as the first diode 421 and the second diode 423. By adding a diode on the ESD path, the ESD path can abide much higher voltage ESD stress. Furthermore, the increase of the equivalent impedance of this ESD path helps the ESD current to spread into different ESD paths.

Figure 8:
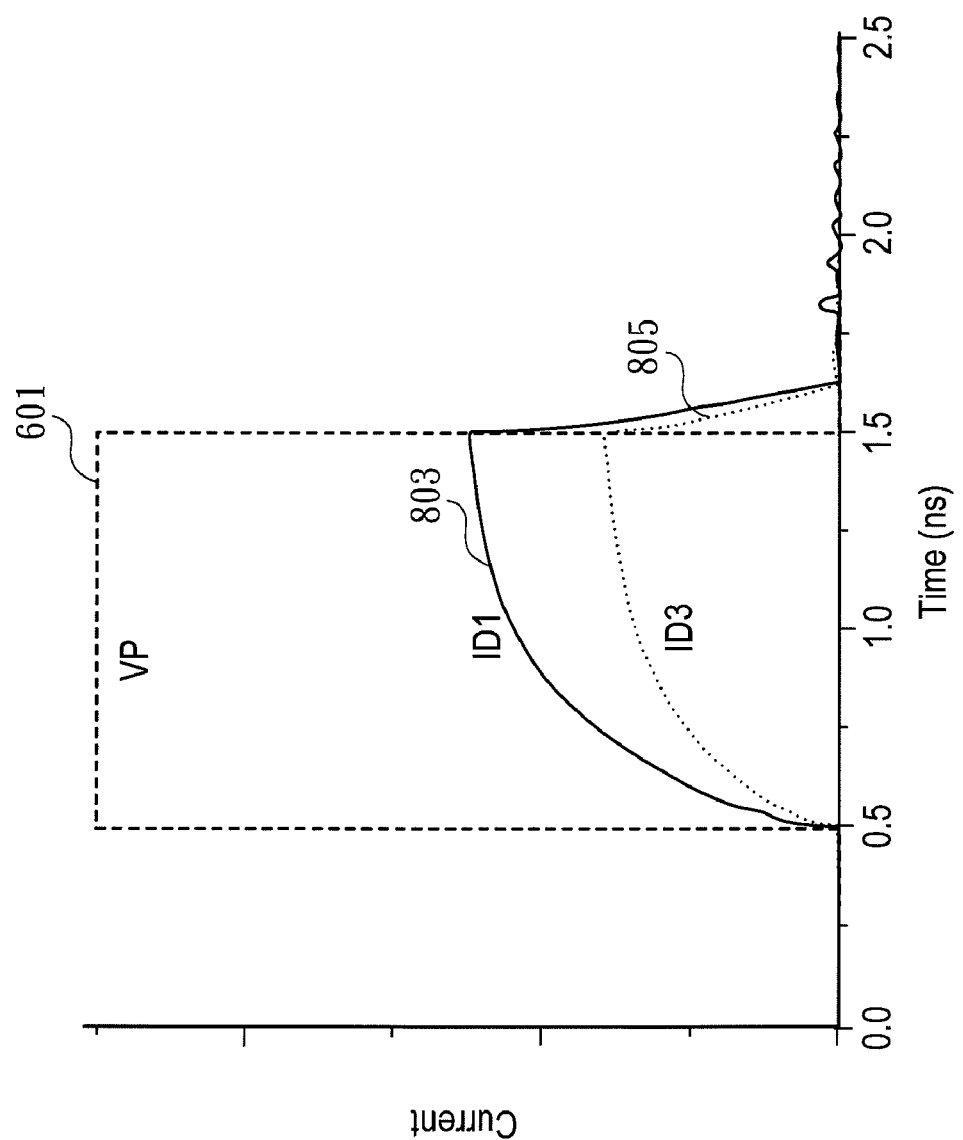
FIG. 8 is a current timing diagram of the ESD protection circuit in accordance with the embodiment shown in FIG. 7 during a positive ESD process.

Referring to FIG. 8, there is shown a current timing diagram of the ESD protection circuit in accordance with the embodiment shown in FIG. 7 during a positive ESD process. A high voltage pulse 601 with 1-ns duration is applied to the low parasitic capacitance ESD protection circuit 70. The first diode and the seventh diode are under the forward-bias condition during the ESD process. The current 803 passing through the first diode and the seventh diode rises following the ESD pulse, and falls to 0 about 0.1 ns after the end of the ESD pulse. The third diode is under the forward-bias condition during the ESD process. The current passing through the third diode also rises following the ESD pulse, and falls to 0 about 0.1 after the end of the ESD pulse.

Wherein, about 62.5% of the ESD current is conducted to the power source through the first diode and the seventh diode, and about 37.5% of the ESD current is conducted to the power source through the third diode. By using the configuration of the present embodiment, the robustness of the ESD protection circuit will be improved.

Figure 9:
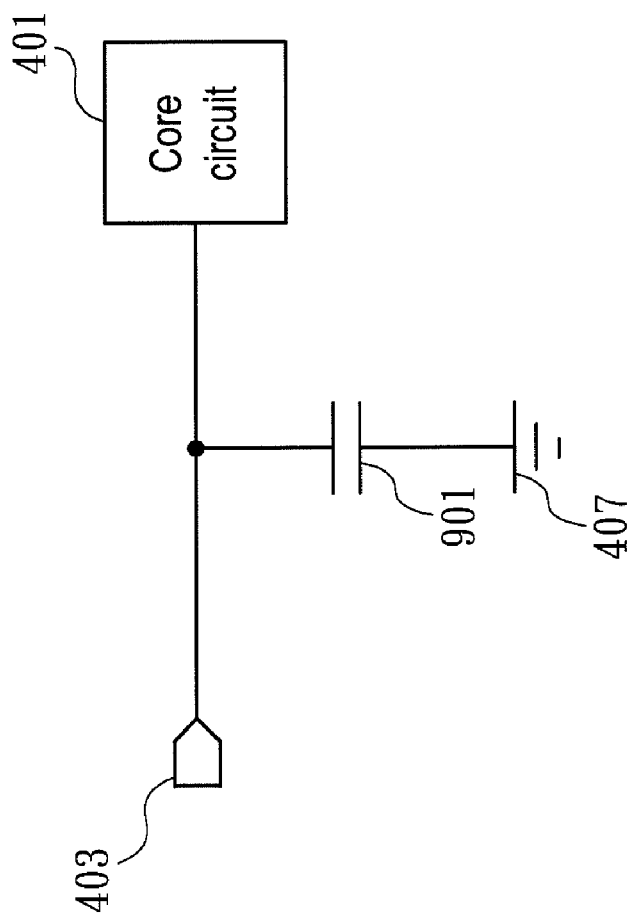
FIG. 9 is a schematic diagram of an equivalent circuit in accordance with one embodiment of the present invention.

Referring to FIG. 9, there is shown a schematic diagram of an equivalent circuit in accordance with one embodiment of the present invention. At the operation frequency of the RF core circuit 401, the ESD protection circuit acts like a total equivalent capacitor 901 connected between the I/O pad 403 and the ground 407. According to the configuration of the embodiment shown in FIG. 4, assume that the equivalent capacitance of the first diode 421 and the second diode 423 are $C_{ESD}$, respectively. Then, the equivalent capacitance of the third diode 425 and the fourth diode 427 are $3C_{ESD}$, respectively, the equivalent capacitance of the fifth diode 441 and the sixth diode 443 are $2 C_{ESD}$, respectively.

The total equivalent capacitance 901 is $2C_{ESD} + (4C_{ESD} \| 6C_{ESD}) = 4.4 C_{ESD}$.

For the embodiment shown in FIG. 7, assume that the equivalent capacitance of the first diode 421, the second diode 423, the seventh diode 728, and the eighth diode 729 are $C_{ESD}$. Then, the total equivalent capacitance 901 is $3.4 C_{ESD}$.

Figure 11:
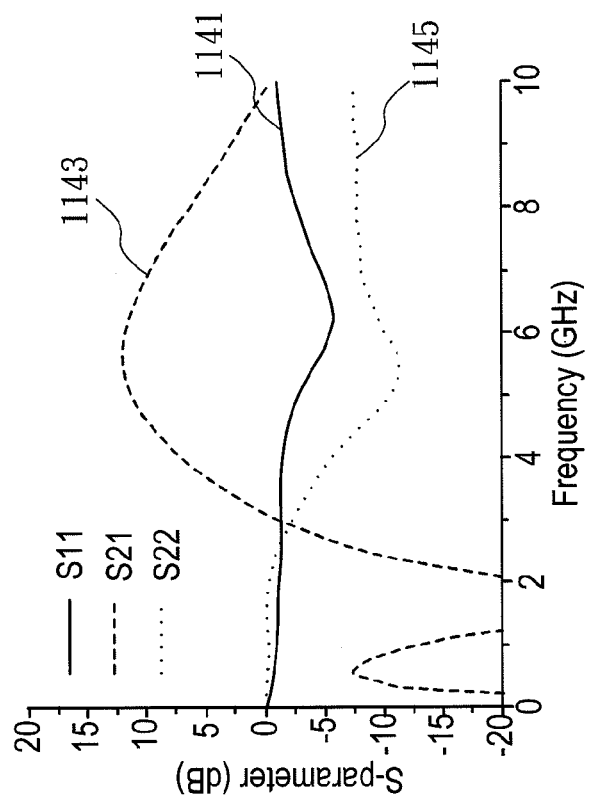
FIG. 11 is an S-parameter diagram of an RF core circuit with the ESD protection circuit in accordance with one embodiment of the present invention.
Figure 10:
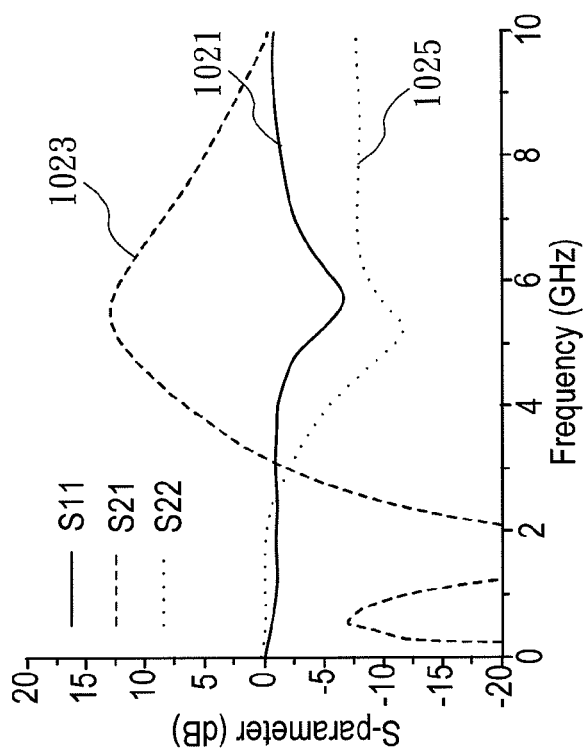
FIG. 10 is an S-parameter diagram of an RF core circuit.

Referring to FIG. 10 and FIG. 11, there are shown an S-parameter diagram of an RF core circuit and an S-parameter diagram of the RF core circuit with the ESD protection circuit in accordance with one embodiment of the present invention.

Figure 1:
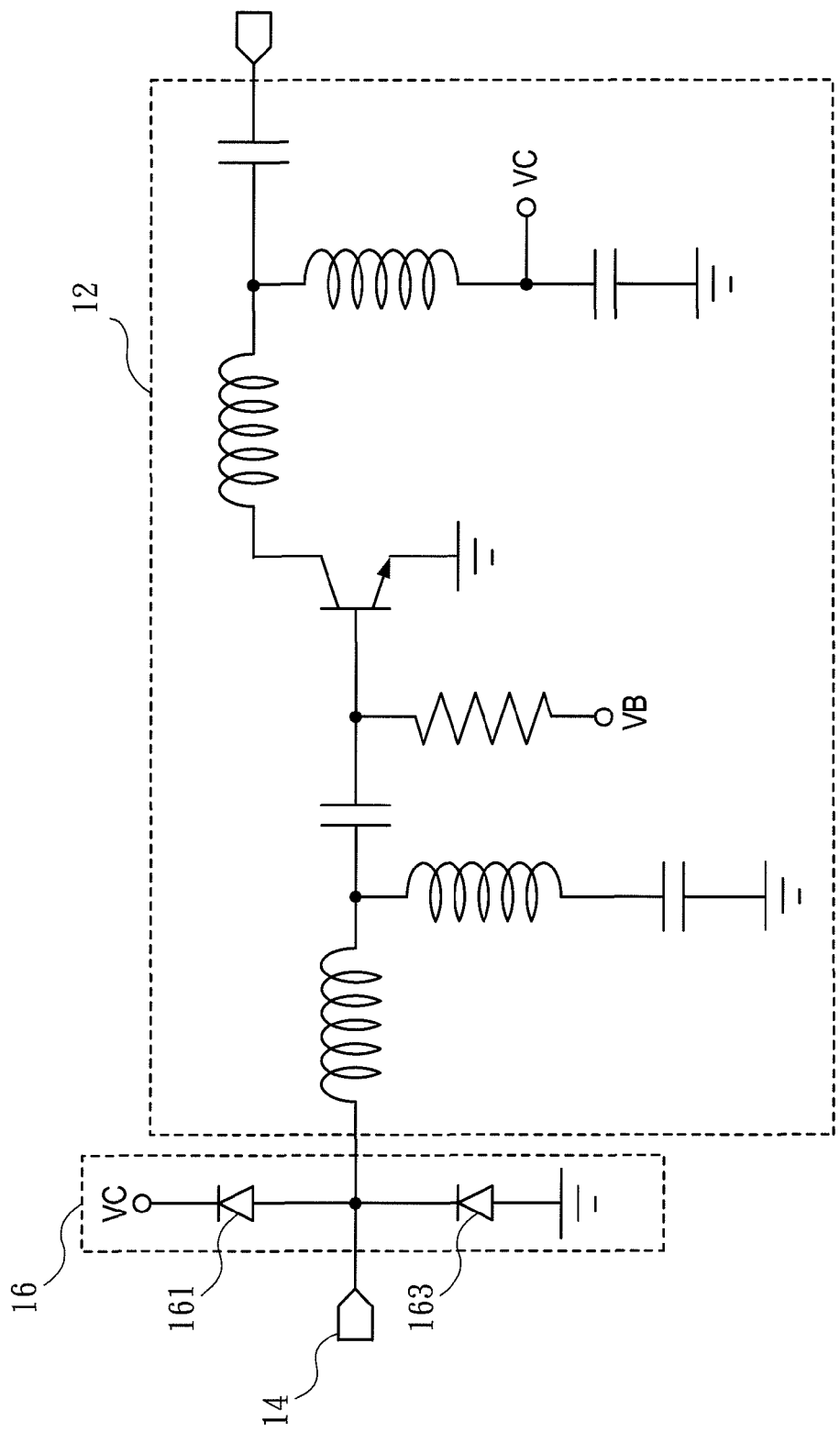
FIG. 1 is a schematic diagram of a traditional ESD protection circuit with an RF circuit.
Figure 2:
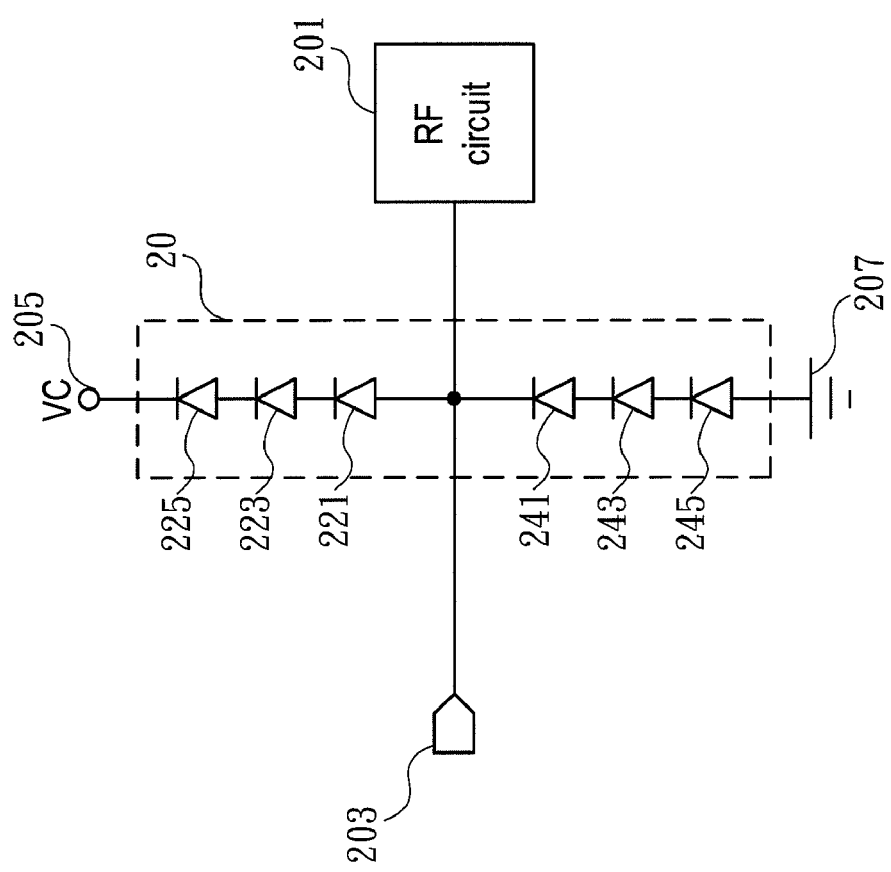
FIG. 2 is a schematic diagram of another conventional ESD protection circuit with an RF circuit.
Figure 3:
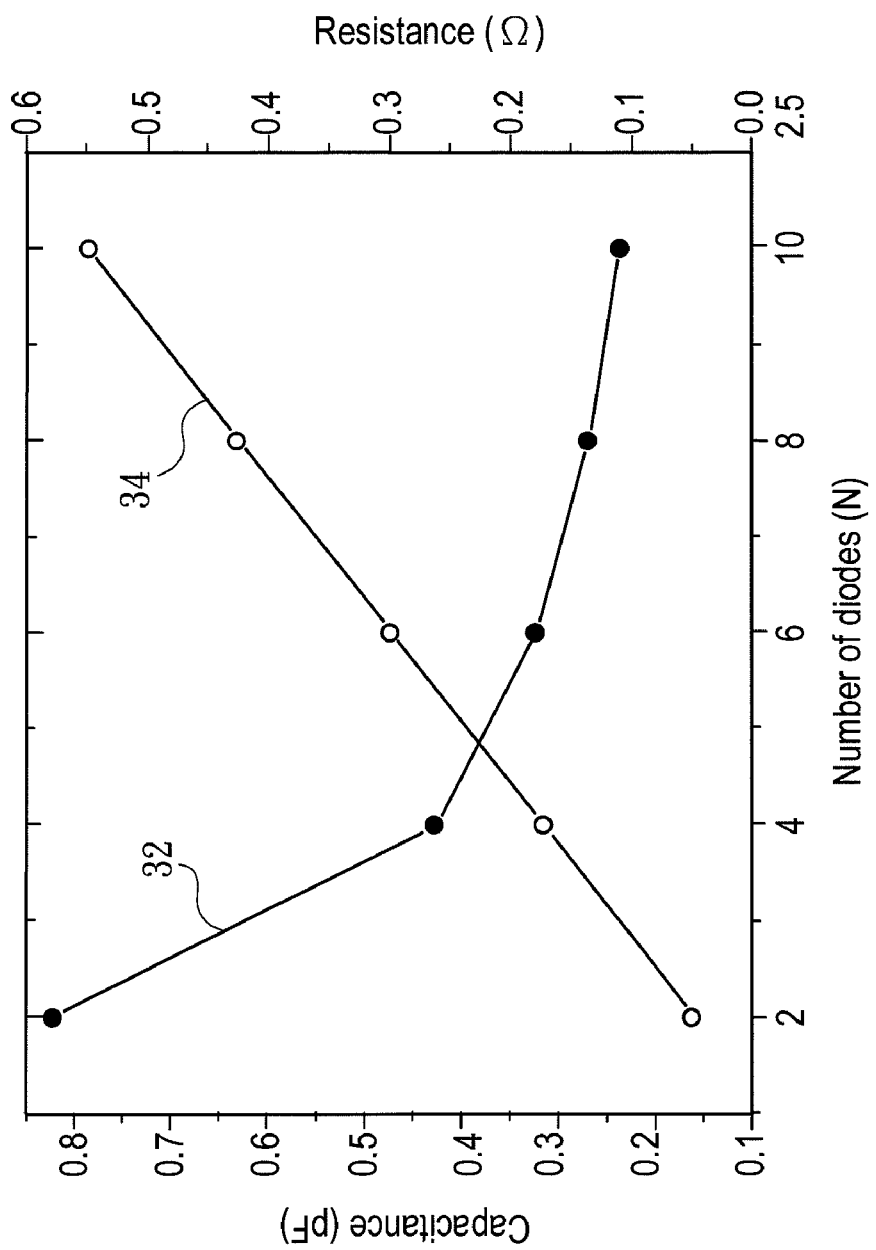
FIG. 3 is a schematic diagram of the relationship among the number of diodes stacked, the equivalent capacitance, and the equivalent impedance.

In this case, the RF core circuit is selected to be the RF circuit 12 in FIG. 1. It is an amplifier, and the operation frequency is 5.8 GHz. The gain (S21) 1023 of the amplifier is about 12.6 dB at 5.8 GHz, the input and output return losses (S11 1021 and S22 1025) are about −7 dB and −9 dB.

The gain 1143 of the amplifier with the low parasitic capacitance ESD protection circuit of the present invention is about 12.3 dB at 5.8 GHz, the input and output return losses 1141 and 1145 are about −5 dB and −10.7 dB.

From the above observation, the gain of the RF core circuit with the low parasitic capacitance ESD protection circuit of the present invention degrades only 0.3 dB than the unprotected amplifier at 5.8 GHz. The input and output return losses of the protected RF core circuit raise 1.7 dB and 0.1 dB than the unprotected amplifier.

Furthermore, a lot of experiments prove that the S-parameters of the RF core circuit with the low parasitic capacitance ESD protection circuit of the present invention keep good shape under 8.5 kV ESD stress in HBM. The RF core circuit with the band-pass structure ESD protection circuit of the present invention can work well under high voltage ESD stress.

The low parasitic capacitance ESD protection circuit can be fabricated with the RF core circuit by using III/V compound semiconductor process, wherein the GaAs heterojunction bipolar transistor (HBT) process is preferable. Of course, the present invention can also be applied in another processes. In the present invention, the configuration of diodes provides high ESD robustness and reduces the circuit area. For the amplifier shown in FIG. 1, the low parasitic capacitance ESD protection circuit of the present invention can be merged into the chip with 1.5 mm×1 mm chip size, no extra chip area is needed.

The low parasitic capacitance ESD protection circuit of the present invention can be used for protecting an RF core circuit, such as an RF transceiver, a low noise amplifier, a power amplifier, or a mixer. The I/O pad 403 of the low parasitic ESD protection circuit can be connected to an antenna or another I/O element.

The present invention is not limited to the above-described embodiments. Various alternatives, modifications and equivalents may be used. Therefore, the above embodiments should not be taken as limiting the scope of the invention, which is defined by the appending claims.

What is claimed is:

1. A low parasitic capacitance electrostatic discharge (ESD) protection circuit which is connected to an input/output (I/O) pad of a radio frequency (RF) core circuit, comprising:
    a first diode and a second diode, wherein the first diode is connected between a power source and the I/O pad, the second diode is connected between the I/O pad and the ground, and the first diode and the second diode are connected in series;
    a third diode and a fourth diode connected between the power source and the ground in series; and
    a fifth diode and a sixth diode connected between the I/O pad and the connection node of the third diode and the fourth diode reversely in parallel;
    wherein the first diode and the second diode have the same size of area, the third diode and the fourth diode have the same size of area, and the fifth diode and the sixth diode have the same size of area; and
    wherein the ratio of the area of the first diode, the third diode, and the fifth diode is 1:9:4.

2. The low parasitic capacitance ESD protection circuit of claim 1, wherein the ratio of the equivalent capacitance of the first diode, the third diode, and the fifth diode is 1:3:2.

3. The low parasitic capacitance ESD protection circuit of claim 2, wherein the equivalent capacitance of the first diode and the second diode are $C_{ESD}$, respectively, and the total equivalent capacitance of the low parasitic capacitance ESD protection circuit is $4.4 C_{ESD}$.

4. The low parasitic capacitance ESD protection circuit of claim 2, further comprising a seventh diode and an eighth diode, wherein the seventh diode is connected between the first diode and the power source, the eighth diode is connected between the second diode and the ground.

5. The low parasitic capacitance ESD protection circuit of claim 4, wherein the seventh diode and the eighth diode have the same size of area as the first diode and the second diode.

6. The low parasitic capacitance ESD protection circuit of claim 5, wherein the equivalent capacitance of the first diode and the second diode are $C_{ESD}$, respectively, and the total equivalent capacitance of the low parasitic capacitance ESD protection circuit is $3.4 C_{ESD}$.

7. The low parasitic capacitance ESD protection circuit of claim 1, wherein the RF core circuit and the low parasitic capacitance ESD protection circuit are integrated in a chip.

8. The low parasitic capacitance ESD protection circuit of claim 1, wherein the low parasitic capacitance ESD protection circuit provides protection of ESD stress in human body model and in machine model.

9. The low parasitic capacitance ESD protection circuit of claim 1, wherein the RF core circuit and the low parasitic capacitance ESD protection circuit are fabricated by AsGa heterojunction bipolar transistor process.

10. The low parasitic capacitance ESD protection circuit of claim 1, wherein the RF core circuit is selected from one of an RF transceiver, a low noise amplifier, a power amplifier, or a mixer.

11. The low parasitic capacitance ESD protection circuit of claim 1, wherein the I/O pad is connected to an antenna or another I/O element.

12. A low parasitic capacitance ESD protection circuit which is connected to an I/O pad of an RF core circuit, comprising:
    a plurality of first diodes connected between a power source and the ground in series;
    a plurality of second diodes connected between the power source and the ground in series; and
    a pair of third diode and fourth diode connected between one connection node of the adjacent second diodes and the I/O pad reversely in parallel;
    wherein the third diode and the fourth diode have the same size of area; and
    wherein the ratio of the area of the first diode, the second diode, and the third diode is 1:9:4.

13. The low parasitic capacitance ESD protection circuit of claim 12, wherein ratio of the equivalent capacitance of the first diode, the second diode, and the third diode is 1:3:2.

14. The low parasitic capacitance ESD protection circuit of claim 12, wherein the RF core circuit and the low parasitic capacitance ESD protection circuit are fabricated by AsGa heterojunction bipolar transistor process.

* * * * *